May 19, 1970     L. C. LYNNWORTH     3,512,400
ULTRASONIC TESTING METHOD
Filed April 13, 1967     2 Sheets-Sheet 1
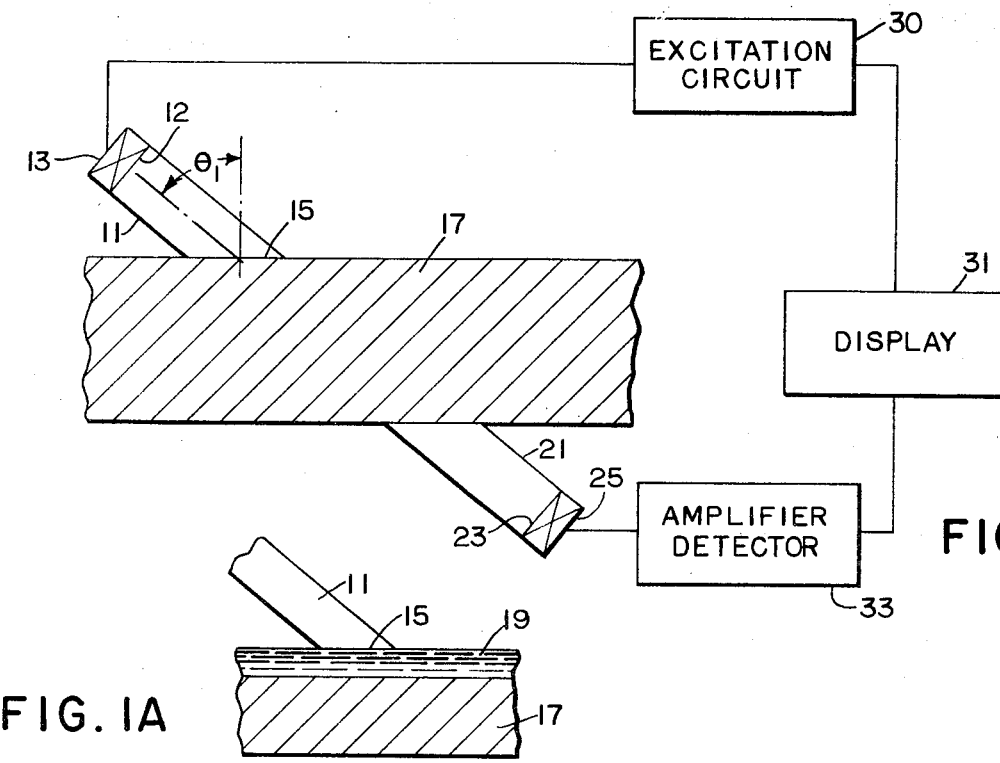
FIG. 1
FIG. 1A
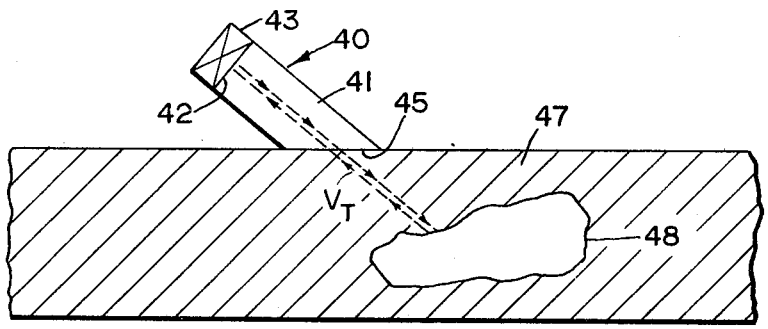
FIG. 2
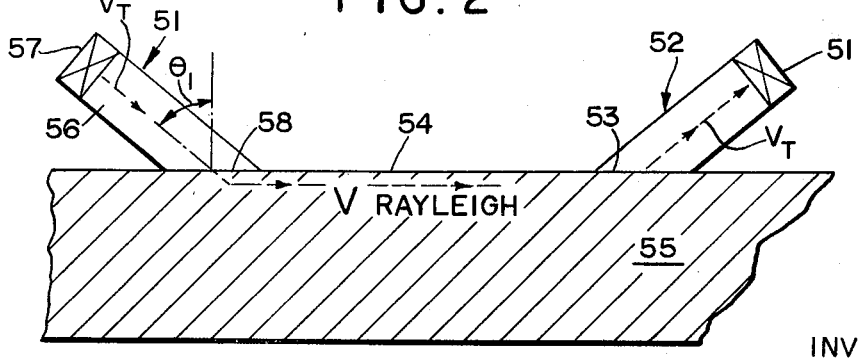
FIG. 3
INVENTOR.
LAWRENCE C. LYNNWORTH
BY
Weingarten, Oxenbuch & Lahive
ATTORNEYS

United States Patent Office 3,512,400
Patented May 19, 1970

---

3,512,400
ULTRASONIC TESTING METHOD
Lawrence C. Lynnworth, Waltham, Mass., assignor to Panametrics, Inc., Waltham, Mass., a corporation of Massachusetts
Filed Apr. 13, 1967, Ser. No. 630,677
Int. Cl. G01m 29/00, 29/04
U.S. Cl. 73—67.5      4 Claims

ABSTRACT OF THE DISCLOSURE

A system for ultrasonic testing of materials using a shear wave transducer mounted on a contact probe. The probe is brought into removable contact with the test material with the SV mode shear waves incident on the surface of the test material at an oblique angle. The angle of incidence of the shear wave and the material in the probe is chosen to provide either SV mode shear waves in the test material, or by mode conversion, other appropriate types of ultrasonic waves, such as Rayleigh waves and Lamb waves.

---

Field of the invention

This invention relates in general to ultrasonic testing and more particularly to a method and apparatus for generating various types of ultrasonic waves within a test material and determining the transmission characteristics of these waves as an indication of qualities of the material.

Prior art

The determination of properties of a test material by measuring the transmission of ultrasonic waves within that material is now a fairly well developed art. Characteristics such as Young's modulus, temperature and the size and location of discontinuities or flaws within a material may be determined by generating suitable ultrasonic waves within the material and measuring their transmission characteristics. There are a number of different types of ultrasonic waves which are of interest. Many characteristics of a material may be determined by measuring the velocity within that material of an applied ultrasonic wave in the longitudinal mode. One significant advantage of the application of longitudinal ultrasonic waves lies in the ease of coupling, in that a probe which generates longitudinal waves may be coupled to the test material through a fluid interface. Ultrasonic shear waves are also extremely useful in materials testing measurements. Shear wave testing possesses some advantages over longitudinal in that it exhibits a very high sensitivity to temperature and also shear waves are very useful for situations in which the generating crystal must be removed a distance from the test material. The shear waves will propagate down the probe without producing mode conversion reflections as do the longitudinal waves in a similar probe. These reflections introduce ambiguities in the measurement of elapsed time from the generation of the ultrasonic waves at the test material until these waves are received at a receiver.

While the above considerations make shear wave transmissions the choice in some situations, the problems of coupling shear waves are a good deal more difficult than those of coupling longitudinal waves. In the past shear waves have been coupled to a test material either by bonding the shear wave probe directly to the material or by applying the shear wave probe at very high pressure normal to the test material. Under these circumstances relatively efficient transmission of the shear waves to the test material may be achieved. However, in many instances such as production quality control tests and the like, neither method of coupling is feasible.

Shear waves have also been generated by transmitting longitudinal waves through an acrylic wedge into oblique incidence with the surface of the material to be tested with the resultant production of shear waves by mode conversion. This approach, however, is limited in terms of satisfactory conditions. The temperature at the wedge cannot exceed 100° C. and the practical upper frequency limit for the waves has been about 6 mHz. Also in order to launch only the shear wave the longitudinal wave velocity in the wedge must be less than the longitudinal wave velocity in the test material. With an acrylic wedge, this condition cannot be met for a large number of test materials including most plastics, some graphites, elastomers and metals.

Three other types of waves, namely Rayleigh, Lamb, and Love waves, have been found useful in particular material testing techniques. Rayleigh waves are surface waves which travel along the surface of the material at a velocity which has a single value for each individual material. The particle vibration in the Rayleigh wave is elliptical with the major axis of the ellipse perpendicular to the surface of the material and the minor axis parallel to the surface and in the direction of propagation of the wave. The wavelength of Rayleigh waves decreases with increasing frequency and hence a high frequency Rayleigh wave does not penetrate significantly into the material. Rayleigh waves are very useful for determination of surface characteristics in that their velocity and attenuation, particularly at high frequency, is a measure of materials characteristics only at or very near to the surface. In the past Rayleigh waves have generally been produced by constructing a probe using an acrylic wedge with a longitudinal ultrasonic crystal mounted on it. The longitudinal waves traveling down the acrylic wedge are then mode converted at the surface of the test material to Rayleigh waves. This system is limited, however, to a maximum frequency of about 6 mHz., yet, as above noted, the effectiveness of the Rayleigh wave measurements is particularly significant at higher frequency. Other limitations on this type of Rayleigh wave generation arise from the characteristics of the acrylic wedge. Thus the acrylic wedge is only useful at ambient temperatures up to about 100° C. Another limitation arises from the velocity of longitudinal waves in the acrylic wedge. In order to produce Rayleigh waves, the velocity of the Rayleigh waves within the test material must exceed the velocity of the longitudinal waves within the wedge. This relation cannot be satisfied where the test materials are relatively low velocity materials such as plastics, graphites, elastomers, wood, brass, copper and others.

Lamb waves are waves which are propagated within a relatively shallow plate and react with the entire plate. These waves may be thought of as waves which advance down the plate reacting with both surfaces and the waves are a combination of shear and longitudinal modes. In the past Lamb waves have usually been generated in the same fashion as Rayleigh waves by using an acrylic wedge with a longitudinal crystal to transmit longitudinal waves into oblique incidence with the surface of the material to be tested. The limitations of this technique are similar to the limitations experienced with respect to the Rayleigh waves. Thus the frequency at which the waves may be launched is limited and the use with low velocity test materials is limited.

Love waves are waves that propagate along a coating where the shear wave velocity in the coating is less than the shear wave velocity in the substrate. Love waves are essentially confined to the coating but have no components perpendicular to the surface.

Summary of the invention

The present invention employs SV mode shear waves generated in a separate probe and obliquely incident upon the surface of test material to provide appropriate ultrasonic waves within the material. The transmission of these waves within the material or along the surface of the material is measured by detecting the transit time or amplitude or both through a portion of the material either at a receiver positioned to receive the generated ultrasonic wave or at the transducer used to generate the waves where this transducer is also arranged to act as a receiver for ultrasonic waves. The source of these ultrasonic waves is a shear wave transducer mounted on a wedge formed of a suitable material, such as a metal, ceramic or plastic with the angle of the wedge selected to produce in the test specimen the appropriate form of ultrasonic waves for the particular test purposes. The shear wave crystal is oriented to produce SV waves with respect to the inclined surface of the wedge. For a given test material, then, an appropriate form of ultrasonic wave can be generated in the material by appropriate selection of the wedge angle, the wedge material, the transducer polarization and the appropriate coupling between the wedge and the test material.

To produce within the test material shear waves in the SV mode, Rayleigh or Lamb waves, the obliquely incident shear waves must be oriented in the SV mode. Obliquely incident SV shear waves may be coupled to the surface of the test material by high pressure coupling, by wringing together optically flat surfaces between the wedge and the test material or by a thin film of fluid or elastomer. While shear waves at normal incidence may not be coupled efficiently between materials through a fluid film, relatively efficient coupling of SV shear waves at oblique incidence may be accomplished through a fluid film. Coupling of obliquely incident SV shear waves through a fluid film in ultrasonic delay line technology has been reported by D. L. Arenberg in the Journal of the Acoustical Society of America, vol. 20, No. 1, published in January 1948. The determination of which type of wave is produced within the test specimen will depend upon the relative materials of the wedge and specimen as well as the angle of incidence. These relationships will be explained in more detail below.

In order to produce within the test material shear waves in the SH mode or Love waves, obliquely incident shear waves in the SH mode may be coupled to the test material but this requires high pressure or wringing optically smooth surfaces.

Brief description of the drawing

In the drawing:

FIG. 1 is an illustration in diagrammatic form of an ultrasonic testing system constructed in accordance with the principles of this invention;

FIG. 1A is an enlarged view of a portion of FIG. 1;

FIG. 2 is an illustration in diagrammatic form of an embodiment of an ultrasonic measuring system constructed in accordance with the principles of this invention;

FIG. 3 is an illustration in diagrammatic form of an embodiment of an ultrasonic transducer constructed in accordance with the principles of this invention for measuring Rayleigh waves;

Description of the preferred embodiment

Figure 4:
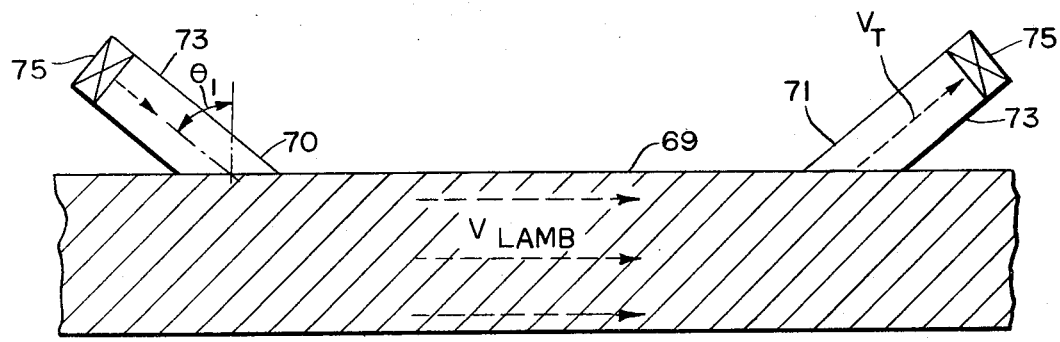
FIG. 4 is an illustration in diagrammatic form of another embodiment of an ultrasonic measurement system constructed in accordance with the principles of this invention for measuring Lamb waves.

Referring now to FIG. 1, there is illustrated a system for determining the transmission characteristics in a test material of ultrasonic shear waves. A wedge element 11 has mounted on its squared off end 12 a transducer 13. The transducer 13 is of a type adapted to emit ultrasonic waves in the shear mode upon application of suitable exciting electrical pulses. The angled face 15 of the wedge 11 is mounted substantially flush to the surface of a test piece 17. A second wedge element 21, which may be of the same dimensional and geometric configuration as the wedge 11, is positioned on the other side of the test piece 17 in approximate axial alignment with the long axis of the wedge 11. Mounted on the squared off end face 23 of wedge 21 is a second ultrasonic transducer 25. Typically this transducer would be formed of a crystal cut to emit shear waves upon excitation.

Connected to the emitting transducer 13 is an excitation circuit 30, which is also connected to display unit 31. The receiving transducer 25 is electrically connected through amplifier detector unit 33 to the display unit 31. The circuit elements of the excitation circuit 30, display element 31 and the amplifier detector 33 are all conventional circuitry used in ultrasonic testing. The excitation circuit 30 provides for pulses of electrical energy to be applied to transducer 13 at predetermined intervals to excite this transducer, thereby emitting shear waves in the direction normal to the face of the transducer and along the longitudinal axis of the wedge 11. The excitation circuit 30 also provides a signal to the display unit 31 indicating the time of origin of these exciting pulses. The display unit 31 might typically be an oscilloscope type of display in which the sweep is triggered by the pulse from the excitation circuit 30 and in which signals from the amplifier detector 33 are displayed. The elapsed time between excitation of the ultrasonic waves and detection of the transmitted waves as well as the amplitude of the detected waves are thus indicated. The velocity and change of amplitude are both propagation characteristics which yield valuable test information about a material particularly in conjunction with variable modes or frequencies of the incident ultrasonic waves.

The transducers 13 and 25 may be oriented to produce either SV shear waves or SH shear waves. The SV shear waves vibrate in a direction such that they have a component perpendicular to the inclined face 15 of the wedge 11. The SH mode shear waves, on the other hand, vibrate in a direction such that they have no component in a direction perpendicular to the face 15. In the case of the shear waves in the SV mode, the surface 15 of the wedge 11 and the inclined surface of the wedge 21 may be coupled to the test specimen 17 by wringing together optically flat surfaces or the coupling may be done through an interface of a fluid film or an elastomeric film. The film interface is shown in FIG. 1A in which the film 19, which may be either a fluid such as oil or an elastomer such as neopreen, is inserted as a couplant between the face 15 and the test specimen 17.

The condition required for generating within the test specimen only an SV shear wave from an incident SV shear wave is that $$\frac{V_{T1}}{\sin \theta_1} = V_{L2}$$

where:

$V_{T1}$ = the velocity of the incident shear wave within the wedge 11, $\theta_1$ is the angle between the axis of propagation of incident shear waves and a normal to the surface 15 at the interface, and $V_{L2}$ is the velocity of longitudinal waves within the test specimen material.

Under these conditions, the SV shear wave within the test specimen 17 is launched at the refracted angle, $$\theta_2 = \sin^{-1}[(1-2\sigma)/2(1-\sigma)]^{1/2}$$

where $\sigma$ is Poisson's ratio in the specimen material.

Since the velocity of a shear wave in a given material is always less than the velocity of a longitudinal wave in the same material, the incident shear wave in the wedge can be used to launch only a shear wave in the test material by proper choice of the angle $\theta_1$, and by selecting the probe or wedge material to be the same as the test material. Of course, the wedge may be formed of any other material which meets the above criterion.

The frequency limitation of about 6 mHz., characteristic of the acrylic wedge when operated in the longitudinal mode with presently used designs, may be avoided in the case of shear wave transmission by using a fine grained or single crystal metal or ceramic material for the wedge, where the shear wave velocity in the wedge, $V_{T1}$, is less than longitudinal wave velocity, $V_{L2}$, in the material to be tested.

When the wedge 11 is formed of either a metal or ceramic, the limitations on ambient temperature experienced with the acrylic wedge are avoided.

Referring now to FIG. 2, there is shown a reflection system in which a shear wave probe 40 serves as both the transmitter and receiver of the ultrasonic waves. The probe 40 includes a transmitting wedge 41 having a transmitting and receiving shear wave transducer 43 mounted on its squared off end face 42. Angled face 45 of the wedge 41 is mounted substantially flush with the surface of the test specimen 47 and is coupled to it either by wringing optically flat surfaces or by the use of a film of fluid or resilient material. The conditions for generating only a shear wave in the test material 47 are, of course, the same as the conditions for the two probe embodiment illustrated in FIG. 1. A suitable use for the one probe configuration of FIG. 2 is the location of voids or flaws, such as that illustrated generally at 48, within a test material. Another use is in weld testing. Multiple zigzag paths may also be used in these tests.

In FIG. 3 there is illustrated a measurement system suitable for using Rayleigh waves to determine the surface characteristics of a test specimen. In FIG. 3 a transmitting probe 51 and a receiving probe 52 are positioned along one surface 54 of the test specimen 55. The transmitting probe consists of a wedge 56 with a shear wave emitting transducer 57 mounted on the squared off end and its angled face 58 mounted flush with the surface 54 of the test material 55. The receiving probe 52 similarly has a shear wave receiving transducer 51 mounted on the squared off end of a wedge 52 which has its angled face 53 mounted flush with the surface 54 of the test specimen 55. In order to convert the shear waves transmitted along the wedge 56 into Rayleigh waves for measuring the surface characteristics of the test material, the transmission velocity $V_{T1}$ for the shear waves within the wedge 56 must be less than the velocity of Rayleigh waves within the test material. In general, the velocity of the Rayleigh wave, $V_R$, within the test material, must equal or exceed the velocity of the shear wave in the probe, $V_T$, divided by the sine of the angle of incidence, $\theta_1$. While, at a given oblique angle of incidence, Snell's law would theoretically permit a wave of Rayleigh wave velocity to be generated within the body of the test material simultaneously with a shear wave, a Rayleigh wave cannot actually exist since Rayleigh waves are by definition surface waves and can therefore only be refracted at an angle which will allow the waves to be transmitted along the surface of the test piece. Therefore, at a critical angle which provides a refracted wave of velocity $V_R$ along the surface, the Rayleigh waves, which at smaller angles have not been present, suddenly appear. Even relatively low velocity test materials may be successfully tested using shear waves to produce the Rayleigh waves. Thus ATJ graphite, which has a Rayleigh wave velocity of about .05 inch per microsecond, has been tested using an acrylic wedge at an angle of incidence of 60°.

In those instances where the material to be tested is not characterized by an extremely low Rayleigh wave velocity, the frequency of the incident shear waves and hence of the Rayleigh waves can be increased using the system shown in FIG. 3 and, as pointed out previously, a substantial advantage is achieved in that at higher frequencies the Rayleigh waves are concentrated in a shallower region near the surface and hence are more directly responsive to variations in the surface. A typical wedge for use at frequencies of 10 mHz. and above is a dense silicate flint glass. The shear wave velocity in this material is about .094 inch per microsecond. Another useful material is tantalum in which the shear wave velocity is about .08 inch per microsecond. Not only can these probe materials be used at high frequency, but also they may be used under severe ambient temperature conditions and under other adverse environmental conditions, in which a plastic wedge could not operate. Since the shear wave velocity in both tantalum and in the flint glass is less than the longitudinal wave velocity in acrylic, wedges of dense flint glass or tantalum may be used with any test material with which the acrylic wedge with longitudinal waves could be used. However, with these non-plastic wedges both high temperatures and high frequencies can be employed.

The measurement system employing Lamb waves is shown in FIG. 4. The Lamb waves are a combination of longitudinal and shear wave components within a relatively thin plate of material. The Lamb waves, therefore, are used to measure plates of material where, at a particular test frequency, the angle of incidence and the thickness of the plate are such as to permit an allowed configuration of the Lamb waves to propagate along the plate. In FIG. 4 a plate 69 has mounted on it a transmitting probe 70 and the receiving probe 71. Each of the probes is formed of a wedge element 73 and a shear wave crystal 75. As in the other configurations the angle of incidence $\theta_1$, and the selection of the probe material with respect to the test material must be such that Snell's law obtains.

Figure 5:
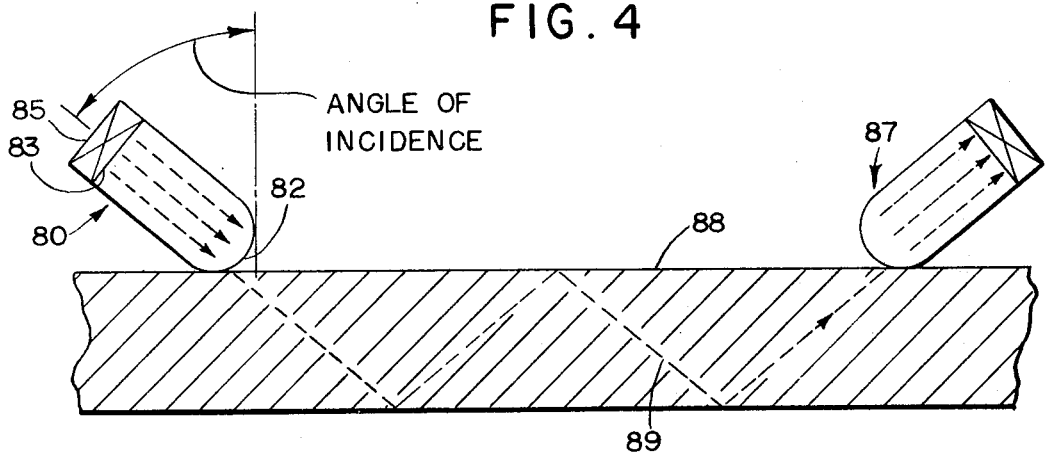
FIG. 5 is an illustration in diagrammatic form of an ultrasonic measurment system employing SH waves for measuring reflected shear waves.

Results somewhat similar to those obtained measuring the transmission of Lamb waves may be accomplished by measuring plates with a zigzag SH shear wave. In FIG. 5 there is illustrated a configuration of an SH shear wave probe for use in such a measurement. Turning to FIG. 5, the transmitting probe 80 is formed of a generally cylindrical contact element 81 having a rounded contact end 82. The squared off end 83 of the probe has mounted on it a shear wave transducer 85, oriented to generate incident SH waves. The receiving probe 87 is similarly constructed. The rounded end 82 of the probe is brought into direct high pressure contact with the plate 88 to be measured. The angle of incidence of the SH shear wave from the probe onto the plate 88 can be varied by rocking the probe on its rounded contact end to an angle in which the angle of incidence is appropriate for the material to be measured to produce a zigzag shear wave, as indicated by the dotted lines 89, which will reflect a number of times off both surfaces and be incident upon the receiving probe 87.

This same type of test may be carried out using zigzag SV shear waves. Such waves may be propagated without mode conversion only under specific conditions of angle of incidence and material. Table I lists the angles of incidence and Poisson's ratio conditions which allow this type of operation.

TABLE I

| Poisson's ratio σ in the specimen | Angle of incidence θ within the specimen |
|---|---|
| 0.00 | ≥45.0° |
| 0.14 | ≥40.3° |
| 0.19 | ≥38.2° |
| 0.22 | ≥36.8° |
| 0.25 | ≥35.3° |
| 0.28 | ≥33.6° |
| 0.31 | ≥31.7° |
| 0.35 | ≥28.7° |
| 0.38 | ≥26.1° |
| 0.45 | ≥16.7° |

Figure 6:
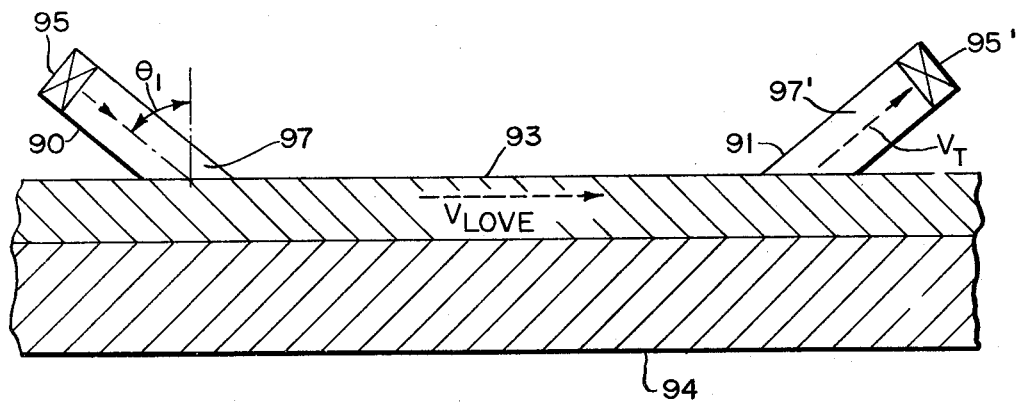
FIG. 6 is an illustration in diagrammatic form of an ultrasonic measurement system employing SH shear waves for measuring Love waves.

In FIG. 6 there is illustrated a configuration of probes suitable for use with generated SH shear waves to produce Love waves in a coating. The Love waves traverse through a coating such as a plastic coating on a metallic substrate, and these waves principally measure the transmission characteristics of the coating. In FIG. 6 a pair of shear wave probes 90 and 91 are positioned to transmit and receive respectively waves from the coating 93 on a substrate material 94. Each of the probes 90 and 91 include a wedge element 97 and 97' respectively and a SH shear wave transducer 95 and 95' respectively. In order to produce Love waves the velocity of transmission of shear waves in the coating material 93 must be less than the velocity of transmission of shear waves in the substrate material 94. Under these conditions the Love waves transmitted essentially in the coating 93 will be substantially parallel to the surface and will have a velocity intermediate between the velocity of a shear wave in coating 93 and a shear wave in substrate 94. Coupling is achieved by wringing or by high pressure.

In the preceding embodiments a shear wave in either the SH or SV mode has been employed as the incident oblique wave. In some instances it may be advantageous to employ a combination of both modes either simultaneously or in time sequence. This can be accomplished by a combination of transducers, by varying the transducer or even rotating the probe. Alternatively a torsional wave, which may be thought of as a shear wave having both SH and SV components, may be used.

While the measurement systems described and illustrated with respect to FIGS. 2 through 6 have not included circuitry, it should, of course, be understood that these transducers will employ circuitry similar to that illustrated in FIG. 1 in order to determine the velocity and attenuation characteristics for the ultrasonic waves between the transmitter and receiver, or from the transmitter to a point of reflection and back to the transmitter again.

The invention having been described, various modifications and improvements may occur to those skilled in the art and the invention should be construed and limited only by the spirit and scope of the appended claims.

What is claimed is:

1. A method for determining the ultrasonic transmission characteristics of a specific test material comprising:
   transmitting through a non-rigid couplant film at a predetermined time a series of shear ultrasonic waves in the SV mode, from an ultrasonic wave generating probe, separate from the test material and including a solid wedge shaped member, into oblique incidence with the surface of said test material, the angle of incidence of said shear waves being such that only one type of wave is generated in said test material;
   detecting at a surface of said material, said produced type of waves after said produced waves have traveled through a portion of said test material; and
   determining from said detected waves the propagation characteristics of said waves through said test material.

2. A method in accordance with claim 1 wherein the angle of incidence of such transmitted SV shear waves with the surface of said test material is such that the only waves produced within said test material as a result of said transmitted SV shear waves are shear waves.

3. A method in accordance with claim 1 wherein said transmitted shear waves are coupled to the surface of said test material through a fluid film.

4. The method of claim 1 wherein said transmitted shear waves are coupled to the surface of said test material through a resilient film.

References Cited

UNITED STATES PATENTS

| | | | |
|---|---|---|---|
| 2,592,135 | 4/1952 | Firestone | 73—67.7 |
| 2,830,201 | 4/1958 | Wilson | 73—67.5 XR |
| 2,851,884 | 9/1958 | Arenberg | 73—67.5 XR |
| 3,165,922 | 1/1965 | Worlton | 73—67.7 |
| 3,302,044 | 1/1967 | Lynnworth et al. | 73—67.5 XR |

FOREIGN PATENTS

| | | |
|---|---|---|
| 766,981 | 1/1957 | Great Britain. |
| 650,422 | 2/1951 | Great Britain. |

OTHER REFERENCES

I. L. Gelles et al.: Apparatus for Thin Sample Ultrasonic Measurements, The Review of Scientific Instruments, October 1966, pp. 1345–1349.

C. S. Brockelsby et al.: Ultrasonic Delay Lines, book pub. 1963 by Iliffe, pp. 14–19.

J. R. Frederick: Ultrasonic Engineering, book pub. 1965 by John Wiley & Sons, Inc., pp. 12–21.

R. C. McMaster: Nondestructive Testing Handbook, The Ronald Press Co., New York 1959, sec. 43–15 to sec. 43–23.

RICHARD C. AUEISSER, Primary Examiner

J. P. BEAUCHAMP, Assistant Examiner

U.S. Cl. X.R.

73—67.7, 67.8